(12) United States Patent
Schoenberg (10) Patent No.: US 10,366,534 B2
(45) Date of Patent: Jul. 30, 2019

(54) SELECTIVE SURFACE MESH REGENERATION FOR 3-DIMENSIONAL RENDERINGS

(71) Applicant: Microsoft Technology Licensing, LLC, Redmond, WA (US)

(72) Inventor: Michael John Schoenberg, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 12 days.

(21) Appl. No.: 14/735,789

(22) Filed: Jun. 10, 2015

(65) Prior Publication Data

US 2016/0364907 A1     Dec. 15, 2016

(51) Int. Cl.
*G02B 27/01*     (2006.01)
*G06T 17/20*     (2006.01)

(52) U.S. Cl.
CPC .......... *G06T 17/205* (2013.01); *G02B 27/017* (2013.01); *G02B 2027/014* (2013.01); *G02B 2027/0127* (2013.01); *G02B 2027/0138* (2013.01); *G02B 2027/0178* (2013.01)

(58) Field of Classification Search
CPC .................. G06T 17/205; G06T 17/10; G06T 2207/10028; G06T 2200/04; G06T 2200/08; G06T 2215/16
See application file for complete search history.

(56) References Cited

U.S. PATENT DOCUMENTS

| | | |
|---|---|---|
| 5,487,172 A * | 1/1996 | Hyatt .................. B60R 16/0373 700/8 |
| 6,008,813 A | 12/1999 | Lauer et al. |
| 7,023,433 B2 | 4/2006 | Tsai et al. |
| 7,095,418 B2 | 8/2006 | Levene et al. |
| 8,587,583 B2 | 11/2013 | Newcombe et al. |
| 9,327,406 B1 * | 5/2016 | Hinterstoisser ........ B25J 9/1697 |
| 2004/0021661 A1 | 2/2004 | Tsuda et al. |
| 2009/0028403 A1 | 1/2009 | Bar-Aviv et al. |

(Continued)

FOREIGN PATENT DOCUMENTS

| | | |
|---|---|---|
| CN | 101976465 A | 2/2011 |
| CN | 103824328 A | 5/2014 |

OTHER PUBLICATIONS

Tykkala, Real-time image-based RGB-D camera motion tracking and environment mapping, Universite Nice Sophia Antipolis; Lappeenranta teknillinen yliopisto (Digipaino, Finlande), 2013, total 173 pages.*

(Continued)

*Primary Examiner* — Mark K Zimmerman
*Assistant Examiner* — Phuc N Doan
(74) *Attorney, Agent, or Firm* — Alleman Hall Creasman & Tuttle LLP (57) ABSTRACT

A 3D voxel grid of an environment is generated, with a signed value assigned to each voxel representative of that voxel's distance from a nearest surface. For each subset of the 3D voxel grid comprising a surface, an initial surface mesh is generated. As new depth information is received, an updated surface is generated only for those subsets of the 3D voxel grid that exhibit greater than threshold change in signed values over time.

18 Claims, 9 Drawing Sheets

(56) References Cited

U.S. PATENT DOCUMENTS

| | | | |
|---|---|---|---|
| 2009/0158174 A1* | 6/2009 | Beverland | G06T 19/00 715/757 |
| 2011/0115787 A1 | 5/2011 | Kadlec | |
| 2012/0194516 A1* | 8/2012 | Newcombe | G06T 17/00 345/420 |
| 2012/0306876 A1* | 12/2012 | Shotton | G06T 17/10 345/424 |
| 2013/0271459 A1* | 10/2013 | Gary | G06T 15/20 345/420 |
| 2013/0275088 A1* | 10/2013 | Gary | G06F 17/50 703/1 |
| 2014/0002455 A1* | 1/2014 | Senften | G06T 17/00 345/420 |
| 2014/0139639 A1* | 5/2014 | Wagner | H04N 13/0253 348/46 |
| 2014/0313290 A1* | 10/2014 | Tech | G06T 15/205 348/43 |
| 2015/0024336 A1 | 1/2015 | Blassnig et al. | |
| 2015/0262412 A1* | 9/2015 | Gruber | G06T 15/50 345/426 |
| 2015/0264367 A1* | 9/2015 | Chong | H04N 19/23 375/240.08 |
| 2015/0363970 A1* | 12/2015 | Spinella-Mauro | G06T 7/596 345/420 |
| 2016/0148433 A1* | 5/2016 | Petrovskaya | G06T 19/006 345/633 |

OTHER PUBLICATIONS

Canelhas, SDF Tracker: A Parallel Algorithm for On-line Pose Estimation and Scene Reconstruction From Depth Images, 2013 IEEE/RSJ International Conference on Intelligent Robots and Systems (IROS) Nov. 3-7, 2013, pp. 3671-3676.*

Schwabsky, Open Fusion Real-time 3D Surface Reconstruction Out of Depth Images, Technion—Israel Institute of Technology—Computer Science Department, 2013, total 35 pages.*

Morgan, Real-time Reconstruction of Depth Sequences Using Signed Distance Functions, Signal Processing, Sensor/Information Fusion, and Target Recognition XXIII 2014, Proc. of SPIE, vol. 9091, pp. 909117-1 to 909117-12.*

Malleson, Single-view RGBD-based Reconstruction of Dynamic Human Geometry, ICCV 2013, pp. 307-314 (Year: 2013).*

Niebner, et al., "Real-time 3D Reconstruction at Scale using Voxel Hashing", In Journal of ACM Transactions on Graphics, vol. 32, No. 6, Nov. 2013, 11 pages.

Loffler, et al., "Generating Smooth High-Quality Isosurfaces for Interactive Modeling and Visualization of Complex Terrains", In Proceedings of 17th International Workshop on Vision, Modeling, and Visualization Workshop, Nov. 2012, 8 pages.

Bjurman, Sebastian, "Realtime Volume Raycasting for Auto-Stereoscopic 3D Displays", In Master Thesis, Nov. 2008, 56 pages.

Muller, Jan, "Volume Modelling and Rendering Based on 3D Voxel Grids", Published on: Dec. 8, 2005, Available at: http://www.uni-koblenz.de/~cg/Diplomarbeiten/VirtualSculpture.pdf.

Wang, et al., Improved Marching Cubes Using Novel Adjacent Lookup Table and Random Sampling for Medical Object-Specific 3D Visualization, In Journal of Software, vol. 9, No. 10, Oct. 2014, 10 pages.

Izadi, et al., "KinectFusion: Real-Time Dynamic 3D Surface Reconstruction and Interaction" SIGGRAPH 2011, Vancouver, British Columbia, Canada, Aug. 7-11, 2011. 1 page.

Newcombe, et al., "KinectFusion: Real-Time Dense Surface Mapping and Tracking". Oct. 2011. Microsoft Research. 10 pages.

Izadi, et al., "KinectFusion: Real-time 3D Reconstruction and Interaction Using a Moving Depth Camera". Microsoft Research Cambridge, UK. Oct. 16-19, 2011. 10 pages.

Perera, et al., "Motion Segmentation of Truncated Signed Distance Function based Volumetric Surfaces" Applications of Computer Vision (WACV), 2015 IEEE Winter Conference. Jan. 5-9. 2015. 8 pages.

Curless, et al., "A Volumetric Method for Building Complex Models from Range Images". Computer Science Department, Stanford University. 1996. 10 pages.

* cited by examiner

SELECTIVE SURFACE MESH REGENERATION FOR 3-DIMENSIONAL RENDERINGS

BACKGROUND

Depth cameras may obtain depth information for an environment, which may be used to generate a 3D model of the surfaces and objects within the environment. As surfaces and objects change and move over time, new depth information may be used to update the 3D model.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A 3D voxel grid of an environment is generated, with a signed value assigned to each voxel representative of that voxel's distance from a nearest surface. For each subset of the 3D voxel grid comprising a surface, an initial surface mesh is generated. As new depth information is received, an updated surface is generated only for those subsets of the 3D voxel grid that exhibit greater than threshold change in signed values over time.

DETAILED DESCRIPTION

Three-dimensional (3D) computer models of a real-world environment are useful in variety of applications. For example, such models can be used in applications such as immersive gaming, augmented reality, robotics, medical imaging, etc. Depth maps of an environment may be obtained from depth cameras, 3D laser scanners, etc. where each data point or pixel of the depth map corresponds to a discrete distance measurement between the depth-map-capturing device and surfaces within the environment.

Based on the depth maps and the position of the depth-map-capturing device relative to the environment, a 3D model of the environment may be reconstructed. Each point in the environment may be represented as a voxel comprising some volumetric signed data. Surfaces of the environment and/or objects within the environment may be rendered by extracting isosurfaces from the volumetric signed data using algorithms such as Marching Cubes.

As objects and surfaces of the environment change positions within the environment, and/or as new depth information about the environment becomes available, the surfaces may be re-rendered in order to update the 3D model. This may occur for systems performing real-time surface reconstruction using data provided by a sensor, and/or systems showing preliminary results while integrating new information from stored data into the volumetric signed data. Such systems are effectively generating a surface mesh that represents the volumetric signed data, and that surface mesh is updated as the volumetric signed data is being updated.

However, generating surface mesh is computationally expensive. As such, much computational power may be wasted on regenerating surface mesh for an entire environment when only portions of the environment are changing or updating. Computational efficiency may be increased by selectively regenerating surface mesh for 3-dimensional renderings and preserving surface mesh for regions of a rendering where the volumetric signed data changes are below a threshold. In this way, surface mesh is only regenerated for portions of the environment when depth information is changed/added, allowing a reduction in computational power without sacrificing resolution of the model, and allowing for frequent updates to the model.

Figure 1:
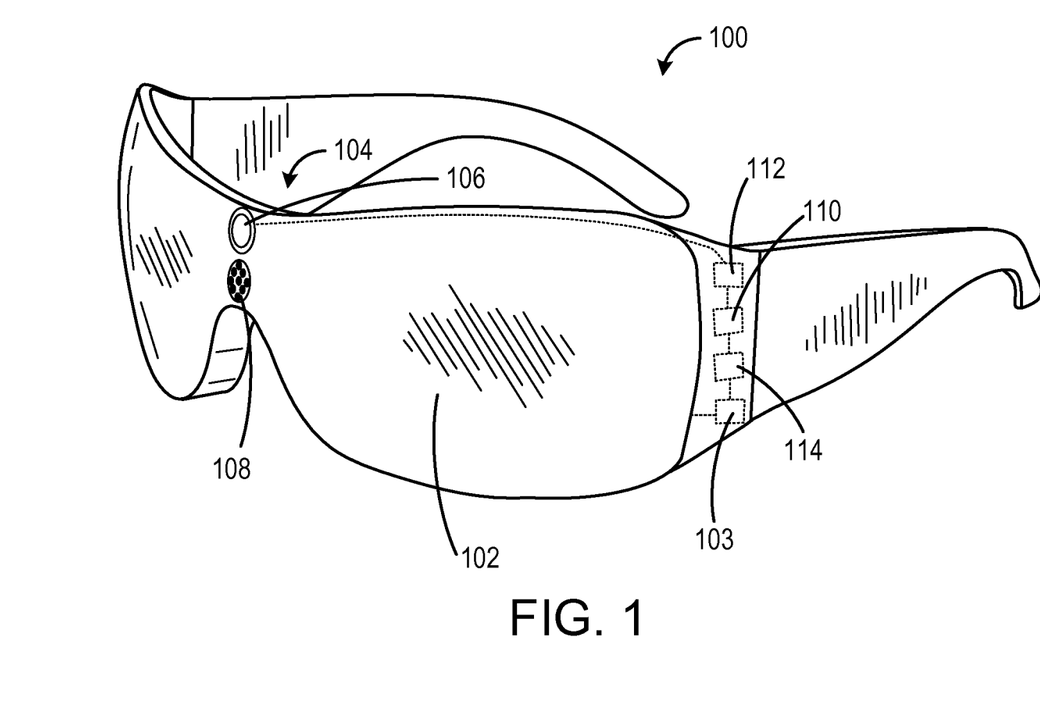
FIG. 1 shows an example head-mounted display system.

FIG. 1 depicts an example head-mounted display system 100. The head-mounted display system 100 takes the form of a pair of wearable glasses or goggles. The head-mounted display system 100 includes a see-through display 102 that may be configured to visually augment an appearance of a physical environment to a user viewing the physical environment through the see-through display.

For example, the appearance of the real-world background may be augmented by graphical content that may be presented with the see-through display 102 such that the graphical content may appear to be in front of the real-world background. In particular, an image production system 103 may be configured to display an image of a virtual object with the see-through display 102.

In some configurations, the head mounted display system may be an additive display system in which holographic light may be displayed on the see-through display. For example, one or more partially transparent pixels can emit light to a user's eye. The user can view real-world objects through and/or around the pixel, but the emitted light can seemingly illuminate the background objects viewed through and/or around the pixel.

The head-mounted display system 100 includes an optical sensor system 104 that may include one or more optical sensors. In one example, the optical sensor system 104 includes an inward facing optical sensor 106 and an outward facing optical sensor 108. The inward facing optical sensor may be configured to perform gaze detection or other analysis on the user's eyes. The outward facing optical sensor may be configured to detect the real-world background from a similar vantage point (e.g., line of sight) as observed by the user through see-through display 102. In some configurations, the sensor subsystem may include two or more different inward and/or outward facing optical sensors (e.g., outward facing color camera and outward facing depth camera).

The head-mounted display system 100 may further include a position sensor system 110 that may include one or more position sensors (e.g., accelerometer(s), gyroscope(s), magnetometer(s), global positioning system(s), multilateration tracker(s), etc.) that output position sensor information useable to assess a position, orientation, and/or movement of the relevant sensor.

Optical sensor information received from the optical sensor system 104 and/or position sensor information received from position sensor system 110 may be used to assess a position and orientation of the vantage point of the see-through display relative to other environmental objects. In some configurations, the position and orientation of the vantage point may be characterized with six degrees of freedom (e.g., 6DOF world-space X, Y, Z, pitch, roll, yaw). The vantage point may be characterized globally or independent of the real-world background. The position and/or orientation may be determined with an on-board computing system (e.g., on-board computing system 112) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. The optical and positional sensor information may be used to create a virtual model of the real-world background using a 3D environment modeling system 114, which may be part of on-board computing system 112. In some configurations, the position and orientation of the optical sensor vantage point may be characterized relative to the virtual space. Moreover, the virtual model may be used to determine positions of virtual objects in the virtual space.

A virtual model of the real-world background generated by 3D environment modeling system 114 may be saved, transmitted to another computing device, and/or rendered into a viewable model (e.g., by image production system 103 or a remote image production system). As described herein, the virtual model may be updated based on changes to the real-world background as detected by optical sensor system 104, or other optical detection systems.

Figure 2:
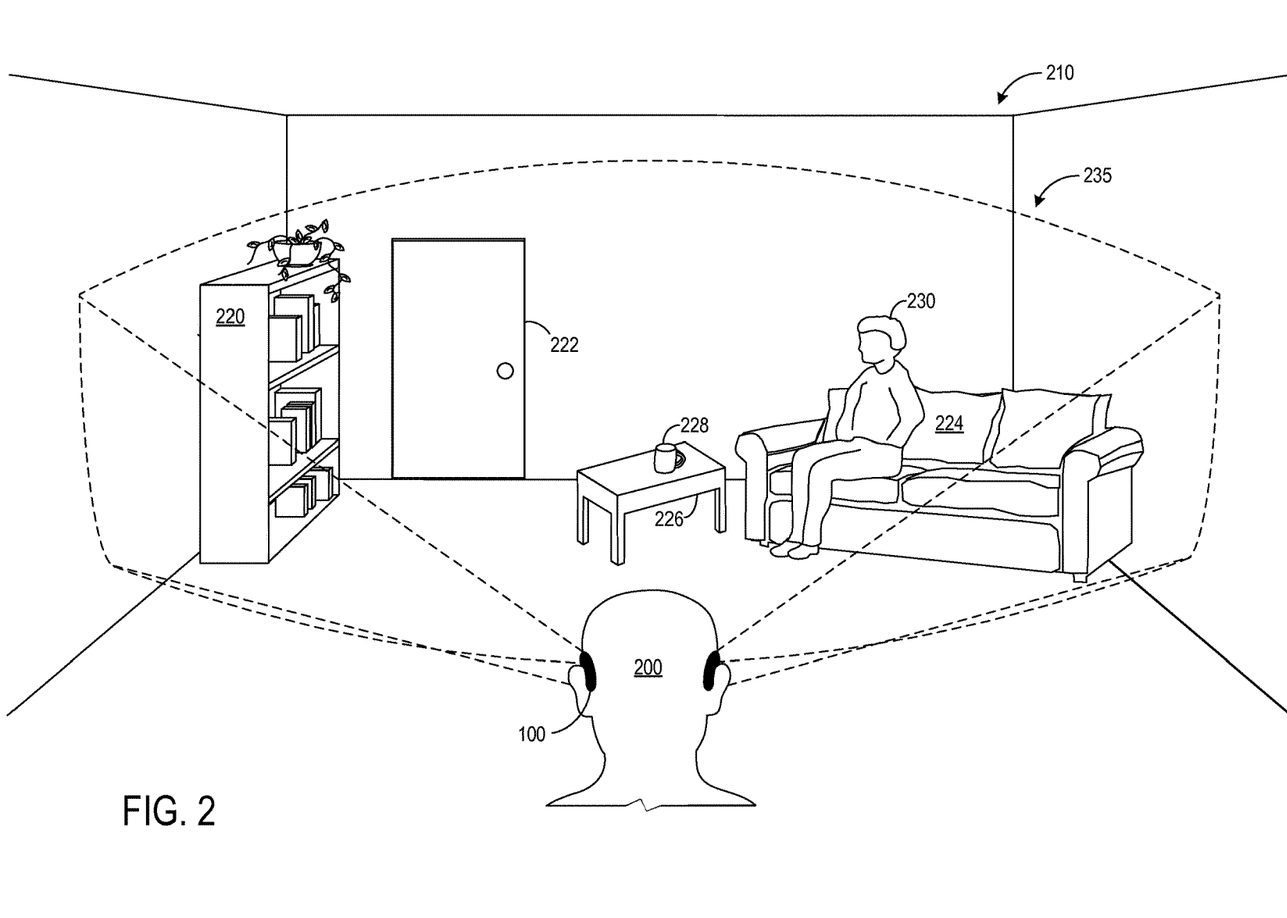
FIG. 2 shows an example environment viewed by a user wearing a head-mounted display system.

FIG. 2 shows a user 200 viewing an environment 210 through head-mounted display system 100. Environment 210 contains various objects, such as bookcase 220, door 222, couch 224, table 226, coffee mug 228, and person 230. Many of the objects are static, although some of the objects may move, such as person 230. Some objects may be moved by user 200 or person 230, such as the door and coffee mug. The position/orientation of moving or static objects may change relative to head-mounted display system 100 as the head-mounted display system moves about the environment. An outward-facing depth camera may capture depth images of the environment and of objects located therein.

The optical sensor system and position sensor system of head-mounted display system 100 may enable individual depth images to be built into a 3D model of environment 210. The position sensor system may also track the position of the optical sensor system in relation to a 3D model of environment 210. Images from multiple depth cameras may be received by 3D environment modeling system 114 and used to build and/or update an overall 3D model of an environment. Further, 3D environment modeling system 114 and position sensor system 110 may output data to an integration engine, which may enable integration of at least part of a 3D model of the environment into an application, such as a gaming application and/or augmented reality engine.

The 3D model of environment 210 may be represented as a 3D voxel grid. Each voxel within the 3D voxel grid may be associated with one or more pieces of data, such as a color, opacity, distance to a nearest surface, other scalar values, etc. Each voxel represents a single point in the environment. To visualize objects represented by voxel data, volume rendering and/or isosurface extraction may be performed by the environment modeling system.

One example algorithm for isosurface extraction is Marching Cubes. In one non-limiting implementation of Marching Cubes, each cube of 8 voxels is analyzed. If one or more voxels within a voxel cube has a value less than a predetermined isovalue (e.g., on one side of an isosurface) and one or more voxels within the voxel cube has a value greater than the predetermined isovalue (e.g., on the other side of the isosurface) it can be assumed that the voxel cube contributes at least a portion of the isosurface. Furthermore, a cube of such voxels can contribute to at least a portion of the isosurface even if the cube does not contain values on both sides of the target isovalue—that is, its neighbor may contain a value on the other side. The boundary voxels can contribute to surfaces, and in one formulation may be more heavily weighted in the summation towards the threshold to account for this.

Based on the voxel isovalues, it can be determined which edges of the voxel cube intersect the isosurface, and polygonal contours may be created dividing the voxel cube between regions within the isosurface and regions outside of the isosurface. The isosurface may be visually represented by a 3D reconstruction mesh (surface mesh). As the voxel grid is updated based on new depth information for the environment, the Marching Cubes algorithm can be re-executed to determine updated boundaries of the isosurfaces, and updated surface meshes can be generated.

However, Marching Cubes is computationally expensive. As such, within an environment such as environment 210, computational power is wasted if Marching Cubes is performed on the totality of the environment for each update to the voxel grid if only some objects within the environment move while other objects remain static. This may require the 3D modeling system to reduce resolution and/or updating frequency, either of which may reduce the quality of the resulting 3D reconstruction.

Figure 3:
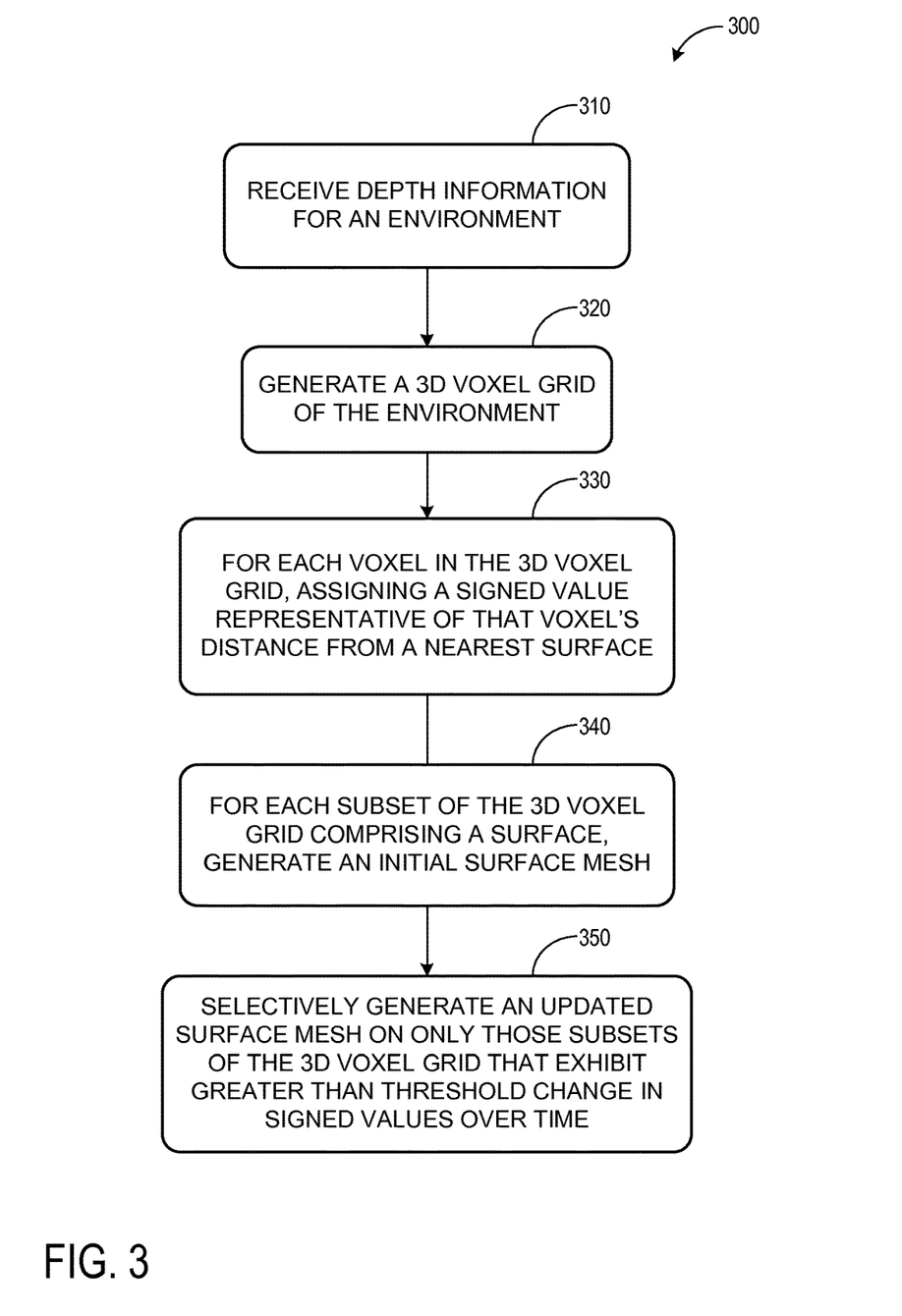
FIG. 3 is a flow diagram for an example method for selectively regenerating a surface mesh for a 3-Dimensional rendering.

FIG. 3 shows a flow chart for an example method 300 for selectively regenerating surface mesh for a 3D reconstruction of an environment. Method 300 enables an isosurface extraction algorithm, such as Marching Cubes, to be applied only to subsets of the environment wherein volumetric data changes above a threshold. If the volumetric data for a subset does not change, or changes less than the threshold, Marching Cubes is not run for that subset, and the previous surface mesh for that subset is preserved. In this way, computing and power savings may be achieved while maintaining high resolution reconstructions that are frequently updated.

Method 300 begins at 310. At 310, method 300 includes receiving depth information for an environment. Depth information for an environment may include a depth image and a 6DOF pose estimate indicating the location and orientation of the depth camera when the depth image was captured. In some embodiments, depth information for the environment may include multiple depth images from one or more depth cameras. For example, as described with regard to FIG. 2, head-mounted display system 100 may be used to take multiple depth images of environment 210 from different locations and orientations. In other examples, one or more stationary and/or movable depth cameras may be situated within an environment in addition to or as an alternative to head-mounted display system 100.

Continuing at 320, method 300 includes generating a 3D voxel grid of the environment. In one example, a 3D voxel grid may be created on a data-storage device where the 3D reconstruction model is to be stored. Example data-storage devices are discussed with reference to FIG. 9. The 3D voxel grid directly represents a spatial portion of the real-world environment.

After generating the 3D voxel grid, method 300 proceeds to 330. At 330, method 300 includes assigning a signed value, such as a signed distance field value for each voxel in the 3D voxel grid representative of that voxel's distance from a nearest surface. The nearest surface to a voxel may include a surface point nearest to the voxel when compared to all other imaged surface points and/or may be constrained to include only a surface point located on a ray extending from the depth camera through the voxel. Signed distance field (SDF) values may be determined via an execution thread, for example. A separate execution thread can be assigned to each voxel in a plane of the 3D voxel grid. For example, if the plane of the 3D voxel grid is the z-plane, then an execution thread is assigned to each combination of x- and y-coordinates of the 3D voxel grid. Each separate execution thread may then perform the same operations to determine SDF values for each voxel.

Figure 4:
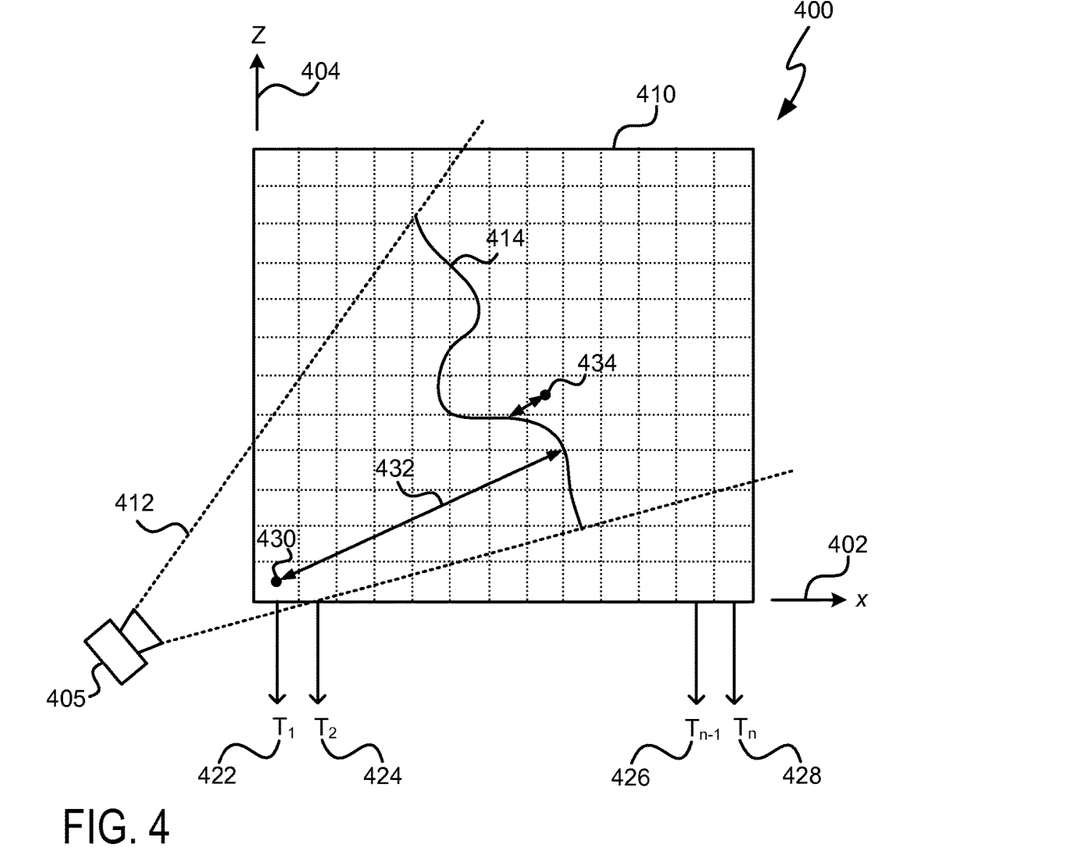
FIG. 4 schematically shows an example process of determining signed distance function values for a voxel grid.

FIG. 4 shows a top-down view of a 3D volume 400 (i.e. showing the x-axis 402 and z-axis 404, while the y-axis is flattened for the purposes of clarity). Depth camera 405 receives a depth image depicting a portion of 3D volume 400. The field of view of the depth camera 405 is shown illustrated in FIG. 4 by the dashed lines indicating the frustum 412 of the depth camera. Volume 400 includes a surface 414.

An execution thread may be assigned to each coordinate on the z-plane of volume 400, denoted $T_1$ (422), $T_2$ (424), ..., $T_{n-1}$ (426), $T_n$ (428). The operations performed by each thread will be described with reference to $T_1$ (422). Initially, the z-coordinate for the execution thread is set to zero, and the {x,y,z} coordinates for the voxel associated with the thread are converted to real-world coordinates. For example, in the case of thread $T_1$ (422), the {x,y} coordinate associated with the thread is {0,0}, so when the z-coordinate is set to zero, this gives coordinates of {0,0,0} (i.e. voxel 430) which can be converted to real-world coordinates. Once the real-world coordinates for voxel 430 have been determined, they can be transformed using the 6DOF location and orientation of depth camera 405 to determine a corresponding location in the depth image for this voxel. In other words, if the voxel representing this point in the real-world is being viewed by the depth camera having its location and orientation, this determines what the coordinates are in the depth image for that point, for example: {pX, pY, pZ}. The depth camera-perspective coordinates can be converted to depth image pixel coordinates (denoted u,v) by u=pX/pZ and v=pY/pZ. As another example, depth maps could be stored, and the closest sample point to each voxel could be determined each iteration.

The depth image coordinates {u,v} for the voxel currently associated with the execution thread are used to determine whether the voxel is located within the frustum 412 of the depth camera. If not, then this voxel can be skipped. With reference to FIG. 4, it is noted that, in the case of thread $T_1$, voxel 430 is within the frustum 412 of the camera. This can be contrasted to, for example, the first voxel considered by thread $T_{n-1}$, which is outside the camera frustum 412, and hence skipped.

If it is determined that the current voxel is within the camera frustum 412, then a signed distance function (SDF) value relating to the distance between the voxel and a point in the environment at the corresponding location to the voxel from the camera's perspective is determined. A signed distance function value calculation gives the value of the distance between the current voxel and a nearest corresponding point (absolute or constrained to camera perspective) on a surface imaged by the depth camera, and is signed such that voxels outside (i.e. in front of) the corresponding point (from the camera's perspective) are given a positive distance, and voxels inside (i.e. behind) the corresponding point (from the camera's perspective) are given a negative distance. A value of zero indicates that the associated voxel is exactly coincident with the corresponding point.

Each corresponding point can be given by the depth value in the depth image at {u,v}. With reference to FIG. 4, when constrained to the camera perspective, the signed distance function value thus represents distance 432 between voxel 430 and the point on surface 414 that maps onto the voxel 430. The SDF value can be calculated readily from the depth value at {u,v} in the depth image minus pZ. Voxel 430 in FIG. 4 is in front of the corresponding point on surface 414, and hence has a positive SDF value. Conversely, voxel 434 in FIG. 4 is behind its corresponding point on surface 414, and hence has a negative SDF value.

The SDF value may then be normalized to a predefined distance value. In one example, this predefined value can be a small distance such as 5 cm, although any suitable value can be used. It is then determined whether the normalized distance is greater than a positive threshold value (if the signed distance is positive) or less than a negative threshold value (if the signed distance is negative). If so, then the SDF values are truncated to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function value (TSDF).

This process is repeated until the execution thread has iterated through all the z-planes. This is performed by each thread allocated to a different x,y coordinate on the z-plane. This can be parallelized in an arbitrary way, or not at all. The result of this process is a 3D volume that comprises voxels having a value between −1 and +1. A value of zero indicates that a surface in the environment is present at that location. This process is provided as an example, and any other process for finding signed distance function values may be used.

Figure 5A:
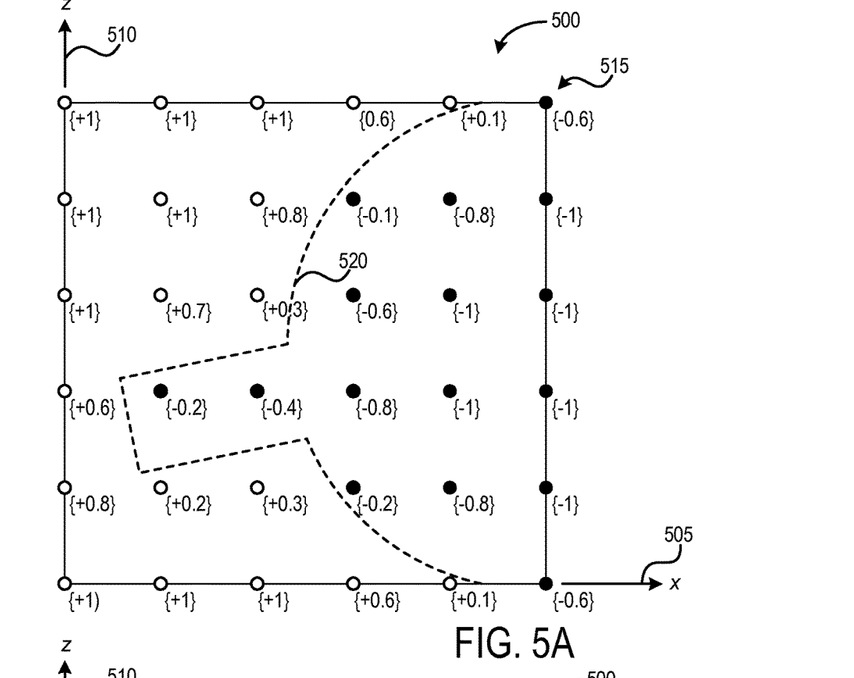
FIG. 5A schematically shows a voxel grid with signed distance function values assigned to each voxel.

FIG. 5A shows an example top-down view of a 3D voxel grid 500 (i.e. showing the x-axis 505 and z-axis 510, while the y-axis is flattened for the purposes of clarity). For example, 3D voxel grid 500 may represent a region of environment 210 comprising coffee mug 228. To aid understanding, front and back surfaces of the coffee mug are detailed in voxel grid 500. In practice, only front surfaces may be detailed because back surfaces will be occluded by front surfaces. However, occlusions can be reduced or eliminated by using multiple cameras and/or multiple perspectives with a single camera. Accordingly, in some implementations, the SDF values may be based on multiple depth maps received from one or more depth cameras at one or more perspectives.

3D voxel grid 500 includes a plurality of voxels 515. In this example, each voxel is assigned a normalized SDF value corresponding to a distance between the voxel and surface 520. Closed circles represent voxels on the interior of surface 520 that have been assigned negative SDF values. Open circles represent voxels exterior to surface 520 that have been assigned positive SDF values. Voxels closer to surface 520 have smaller absolute SDF values, while voxels further from surface 520 have larger absolute SDF values, excepting for voxels that are further away from surface 520 than the threshold distance. These voxels are each assigned a truncated SDF value of +1 (exterior) or −1 (interior).

For each voxel, a weighting function may be assigned along with an SDF value. The weighting function may be based on a certainty that the SDF value represents the actual distance of the voxel from the nearest surface. For example, SDF values at the boundaries of a surface may be less certain than SDF values in the center of a surface. The weighting function may further be based on the resolution of the depth camera that generated the depth image, and a certainty that the 6DOF pose of the depth camera relative to the environment is accurate. A weighted SDF value may then be determined and assigned to each voxel. In this way, multiple depth maps may be used to generate an SDF value for each voxel within a depth map. Weighted SDF values may also be used to aggregate multiple SDF values derived from a single depth map, which may occur due to noise, movement, lighting, etc.

Returning to FIG. 3, at 340, method 300 includes generating an initial surface mesh for each subset of the 3D voxel grid comprising a surface. The initial surface mesh may be determined based on the SDF values assigned to the voxels in the 3D voxel grid. The initial surface mesh may be derived using an algorithm such as marching cubes, marching tetrahedrons, raycasting, adaptive skeleton climbing, etc., as well as extensions and derivatives of such algorithms.

Figure 5B:
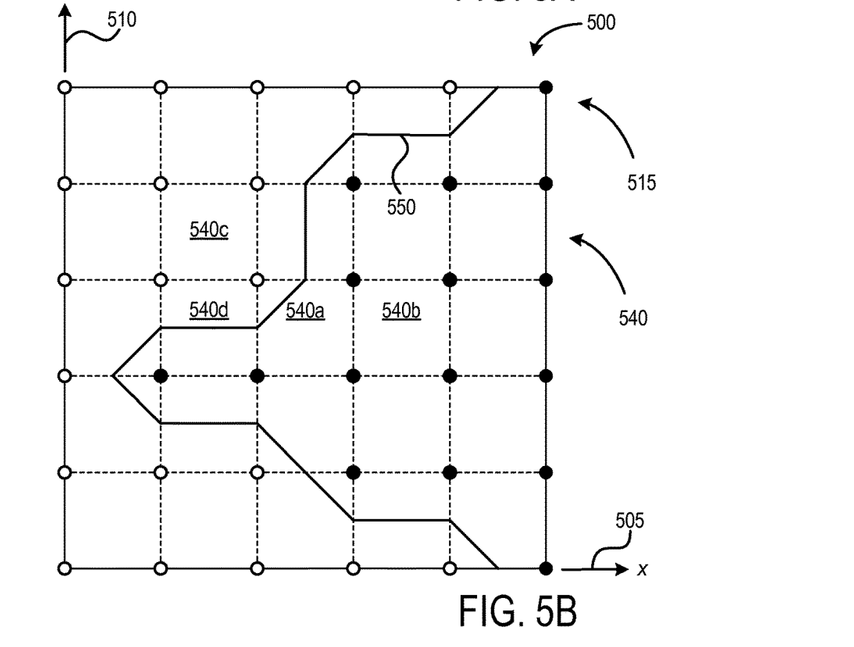
FIG. 5B schematically shows an example surface mesh generated based on the signed distance function values for the voxel grid of FIG. 5A.

For simplicity, the generation of an initial surface mesh is shown in two dimensions in FIG. 5B. In this example, a Marching Squares algorithm is used to represent the extraction of a surface boundary in two dimensions from the signed distance field information shown in FIG. 5A. FIG. 5B shows a top-down view of 3D voxel grid 500. Each square of 4 voxels is analyzed as a voxel square 540. A contour segment is assigned to each square wherein one or more voxels has an SDF value greater than the threshold (0) and wherein one or more voxels has an SDF value less than the threshold. A surface boundary 550 may thus be generated from the cumulated contour segments.

For example, voxel square 540a comprises three voxels with negative SDF values and one voxel with a positive SDF value. As such, a contour segment is assigned, dividing the voxel with a positive SDF value from the voxels with negative SDF values, thereby approximating the portion of the surface within voxel square 540a. In contrast, voxel square 540b comprises four voxels with negative SDF values. As such, all voxels within voxel square 540b may be assumed to be on the same side of surface boundary 550, and no contour segment is assigned. Similarly, voxel square 540c comprises four voxels with positive SDF values, and no contour segment is assigned. Voxel square 540d comprises two voxels with negative SDF values and two voxels with positive SDF values. As such, a contour segment is assigned dividing the voxel square in half, and connecting to the contour segment assigned to adjacent voxel square 540a. In some examples, the surface boundary may be subject to smoothing and/or interpolation to more accurately estimate the contour of a surface based on the depth information.

Figure 6:
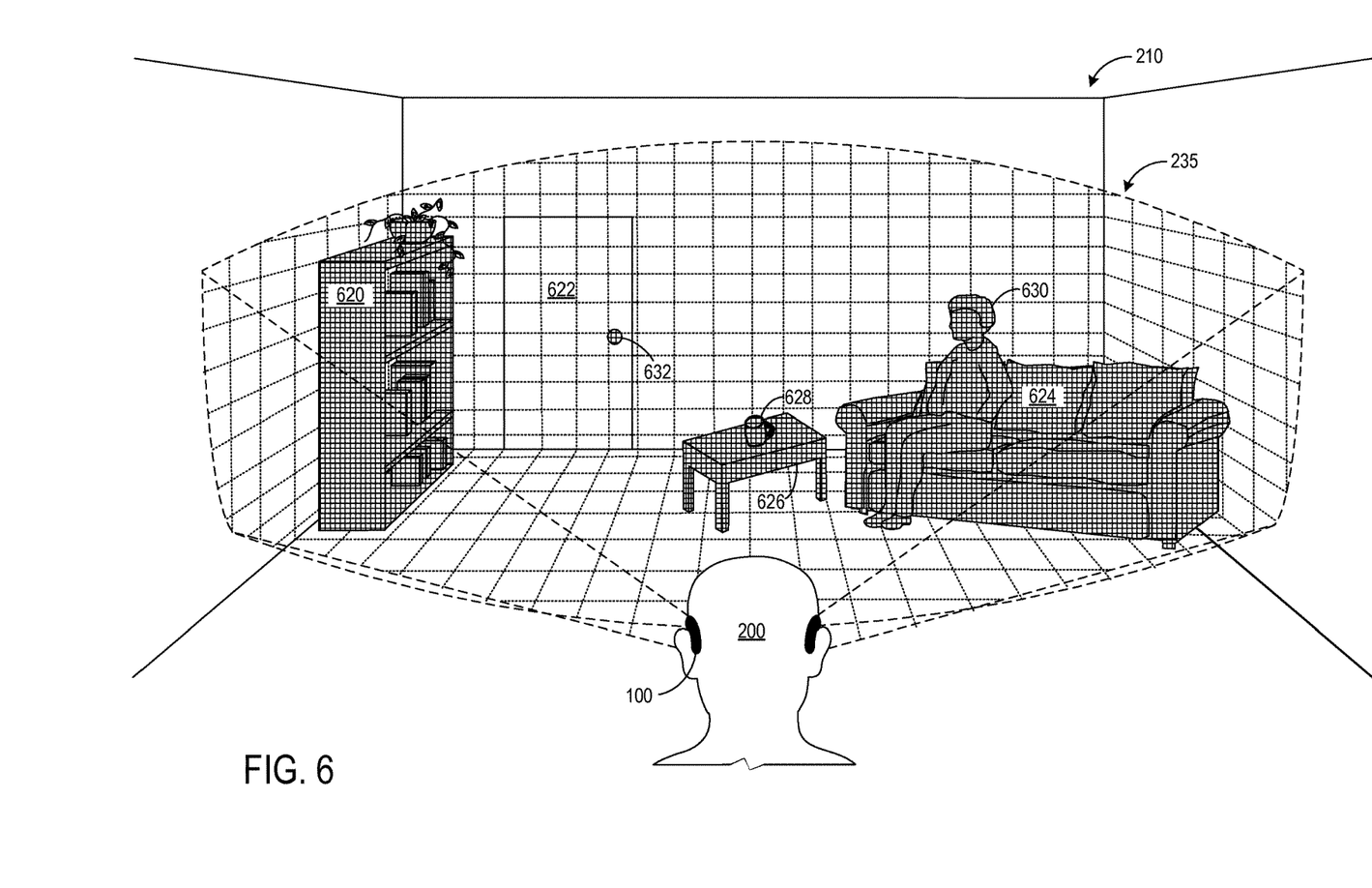
FIG. 6 illustrates a surface mesh for an example environment viewed by a user wearing a head-mounted display system.

An example initial surface mesh in 3 dimensions is schematically shown in FIG. 6. In this example, surfaces in environment 210 within the viewing window 235 of head-mounted display system 100 are represented by surface mesh. 3D reconstructions are shown for various objects, including bookcase surface mesh 620, door surface mesh 622, couch surface mesh 624, table surface mesh 626, coffee mug surface mesh 628, and person surface mesh 630. Depending on the depth information available, adjacent reconstructions, such as couch surface mesh 624 and person surface mesh 630, or table surface mesh 626 and coffee mug surface mesh 628 may comprise a contiguous 3D reconstructive mesh. In this example, the walls and floors of environment 210 are represented with a different surface mesh pattern than the objects within the environment, but in some examples, the background of the environment may be contiguous with the objects therein. Door surface mesh 622 may not be discernable from the background if the door is flush with the surrounding wall. However, a doorknob surface mesh 632 is shown, as the doorknob extends away from the door. In some implementations, a single surface mesh may be constructed for all imaged environment, without any separation of discrete objects within the environment.

Returning to FIG. 3, at 350, method 300 includes selectively generating an updated surface mesh on only those subsets of the 3D voxel grid that exhibit greater than threshold change in signed values over time. As additional depth information is received at the depth camera(s), new SDF values (which may be normalized and/or truncated) are assigned to each voxel. The new SDF values may then be combined with any previous SDF value stored at each respective voxel. The new SDF value may be combined with one or more previous SDF values by averaging. For example, an exponentially decaying moving average can be used. This may assist with building models of environments with moving objects, as it enables an object that has moved to disappear over time as the measurement that added it becomes older and averaged with more recent measurements. In another example, the average can be a weighted average that uses a weighting function relating to the distance of the associated voxel from the depth camera. The averaged SDF values can then be stored at the current voxel. In an alternative example, two values can be stored at each voxel. A weighted sum of the SDF values can be calculated and stored, and also a sum of the weights calculated and stored. The weighted average can then be computed as (weighted sum)/(sum of weights).

As multiple frames of depth images may be received over time, the stored reconstruction model is gradually built up in more and more detail. Repeated measurements of the same region of the environment add more detail and effectively increase the resolution and/or confidence of the information provided by the depth camera. Furthermore, noise may be effectively averaged out from the depth images, leaving a more accurate surface mesh. This enables detail to be seen in the reconstruction model that cannot be seen from an individual depth image.

As described herein, performing Marching Cubes on the entirety of a 3D voxel grid may be computationally prohibitive. In some approaches, subsets of the 3D voxel grid that are determined to be empty are exempted from iterative Marching Cubes. However, this approach may still result in Marching Cubes being iterated on the interior and boundaries of static objects which are not empty, but do not move or change over time. By selectively generating an updated surface mesh on only those subsets of the 3D voxel grid that exhibit greater than threshold change in signed values over time, the computational footprint may be further reduced.

Figure 7:
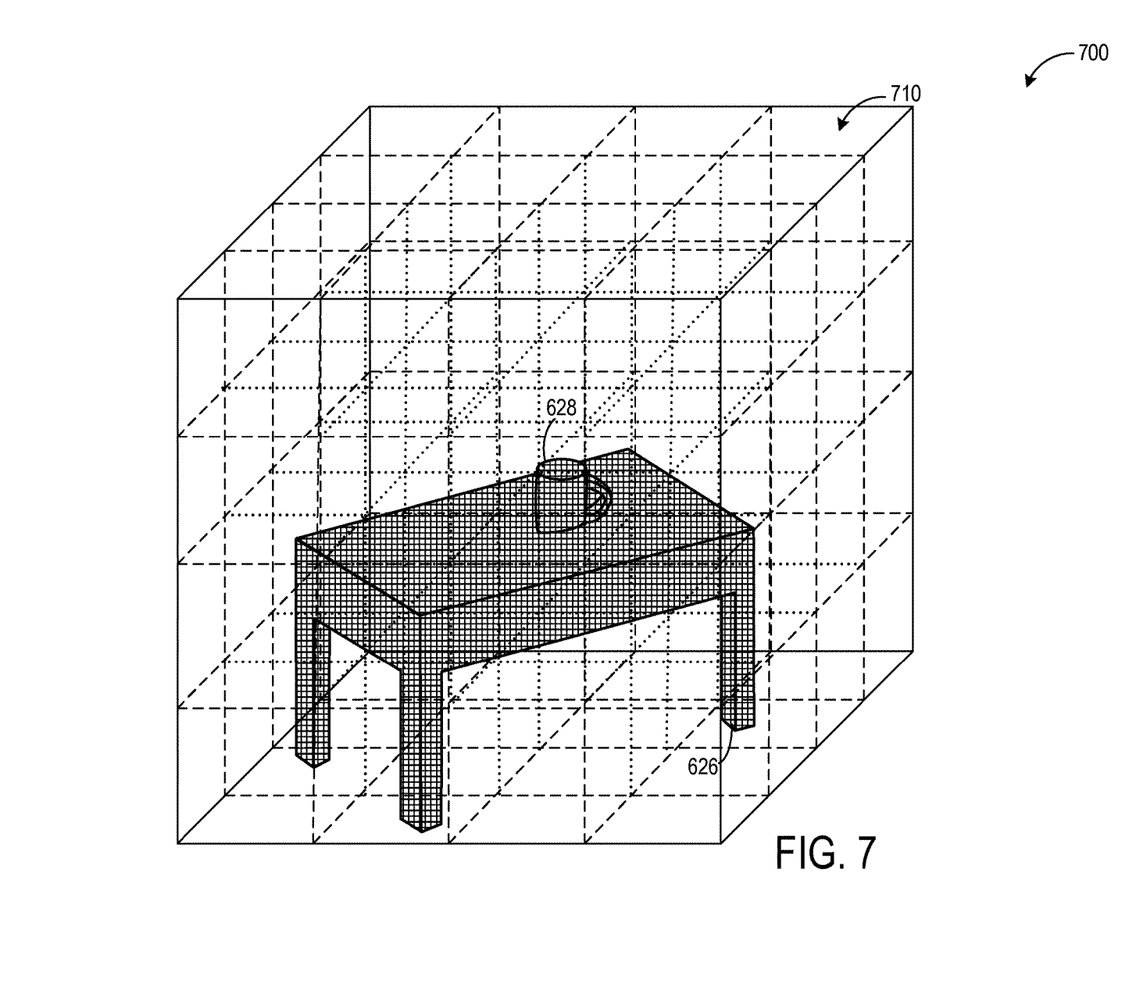
FIG. 7 schematically shows a portion of a surface mesh reconstruction for a voxel grid comprising a plurality of voxel subsets.

In one example, the 3D voxel grid may be subdivided in to subsets representing a portion of the entire 3D voxel grid. FIG. 7 shows an example 3D voxel grid 700, representing a portion of the voxel grid for environment 210. Voxel grid 700 is shown divided into 64 subsets 710. The number of subsets may vary based on depth image resolution, available computing power, etc. Each subset contains multiple voxel cubes. If an update to the surface mesh for a subset is indicated, the Marching Cubes algorithm may be applied to each voxel cube within the subset. In this example, subsets 710 are cubic, but may be other shapes, based on the isosurface generating algorithm, shape of the environment, etc. In some implementations, subset size and shape may be dynamically updated, for example responsive to prior observed above threshold changes (i.e., subsets observing above-threshold changed further divided into smaller volumes and/or contiguous subsets observing below-threshold change merged into a larger volume).

As new depth information is received, and updated signed distance field values are assigned, the updated signed distance field values are compared to the previous signed distance field values for each voxel. For each subset, if the sum of the value differences for each voxel within the subset is greater than a threshold, Marching Cubes may be executed on the subset. If the sum is less than the threshold, the mesh reconstruction for that subset is preserved from the previous iteration.

As an example, a subset (A) may contain signed distance field values representing an environment at time $t_1$ (SDF_$A_{t1}$). These signed distance field values may be used to generate a surface mesh $A_{m1}$. At a time $t_2$, the signed distance field values are updated for subset (A) (SDF_$A_{t2}$). A difference (D) between SDF_$A_{t1}$ and SDF_$A_{t2}$ may be recognized. If D exceeds a threshold T, a mesh $A_{m2}$ is generated and used to describe the region of space corresponding to this subset. Otherwise, $A_{m1}$ is re-used. This method allows computational and power savings by not iteratively regenerating mesh that is determined to be substantially similar to previous mesh generated for the same space.

The difference (D) between SDF_$A_{t1}$ and SDF_$A_{t2}$ may be recognized using any number of suitable algorithms, where D=F(SDF_$A_{t1}$, SDF_$A_{t2}$). In some examples, the sum of absolute differences of SDF values at each voxel within a subset may be determined. Additionally or alternatively, an indicator function may be generated based on one or more properties of a histogram of the differences of SDF values at each voxel within the subset. Additionally or alternatively, a difference in a feature descriptor may be determined for SDF_$A_{t1}$ and SDF_$A_{t2}$. For example, the feature descriptor may comprise the sum of absolute differences of coefficients of a 3D discrete cosine transform for each voxel within the subset.

Further, the difference (D) may be determined over the course of multiple new SDF integrations. The accumulated difference may then be compared to a threshold to ensure that subsets that update slowly will eventually regenerate mesh as well.

Discontinuities may be generated at subset boundaries when a voxel cube generates new mesh and a neighbor does not. The maximum magnitude of the discontinuity may be correlated with threshold (T). A tradeoff is therefore available between performance gains with a decreasing threshold (T) and a decrease in quality via tear size with an increasing threshold (T).

Figure 8:
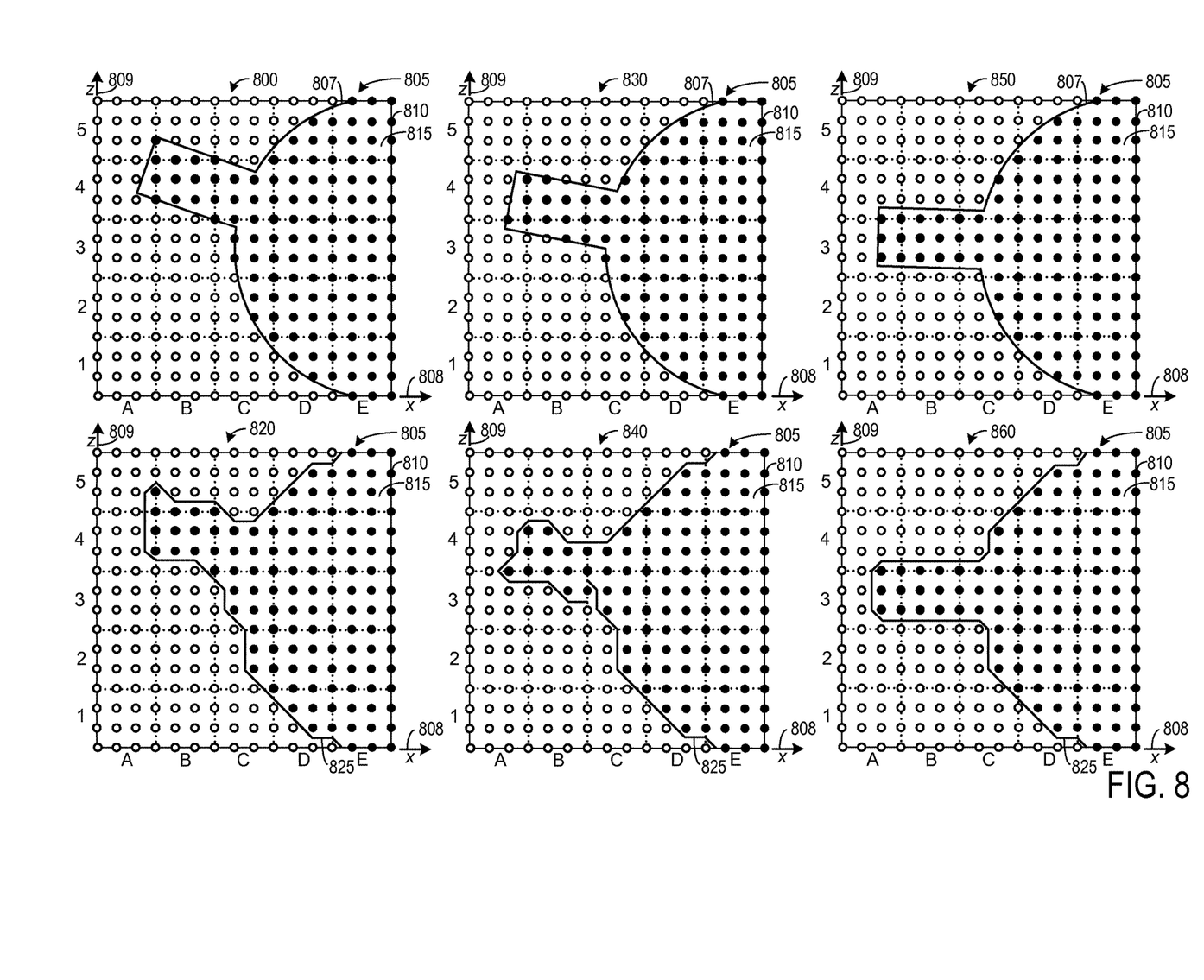
FIG. 8 schematically shows an example voxel grid and an example surface mesh that update over time.

FIG. 8 depicts examples of how surface mesh may be selectively updated for subsets of a voxel grid over time. As per FIGS. 5A-5B, the 2D Marching Squares algorithm will be used as a proxy for 3D Marching Cubes for simplicity of depiction. At 800, a voxel grid 805 is shown, overlaid with a surface boundary 807 (e.g., representing a region of environment 210 comprising coffee mug 228. Voxel grid 805 shows x-axis 808 and z-axis 809. Voxel grid 805 comprises a plurality of voxels 810, where closed circles represent voxels on the interior of surface boundary 807, and are assigned negative distance values. Open circles represent voxels exterior to surface boundary 807, and are assigned positive distance values. For simplicity, the SDF values for each voxel 810 may be considered to be truncated at either −1 (interior) or +1 (exterior). In this example, the threshold for re-executing Marching Squares on a subset is set at two voxels changing SDF values.

Voxel grid 805 comprises a plurality of voxel subsets 815. In this example, voxel grid 805 comprises 25 voxel subsets 815. Voxel subsets 815 are labeled along the x-axis from A-E, and along the z-axis from 1-5. For example, the voxel subset at the lower left hand corner of voxel grid 805 will be referred to as voxel subset A1. Each voxel subset includes 16 voxels 810. Adjacent voxel subsets share voxels along edges or corners of the subset. At 820, surface boundary 825 is shown, derived from executing a Marching Squares algorithm on voxel grid 805 as shown at 800.

At 830, voxel grid 805 is shown following an update of the SDF values for voxels 810 based on movement of surface boundary 807. For example, coffee mug 208 may have been rotated slightly, changing the position of the mug handle with respect to the voxel grid, while maintaining the position of the mug body. At 840, surface boundary 825 is shown as updated based on the updated SDF values shown at 830, with respect to the SDF values shown at 800.

From 800 to 830, voxel subsets A1, A2, B1, B2, C1, C2, C5, D1, D2, D3, D4, D5, E1, E2, E3, E4, and E5 do not experience any change in SDF values. Accordingly, Marching Squares is not run on these subsets, and the contour segments for these subsets are maintained at 830. Voxel subsets A3, A4, A5, B3, B4, B5, and C4 experience a threshold change in SDF values, as at least two voxels in each subset transition between the interior and exterior of surface boundary 807. Marching Squares is thus executed for these subsets, and the respective contour segments updated accordingly. One voxel within voxel subset C3 changes from a positive SDF value to a negative SDF value, which is below the threshold for re-executing Marching Squares on that subset. As such, the contour segment for voxel subset C3 is maintained, yielding a discontinuity in surface boundary 825 at the interface of subsets B3 and C3.

At 850, voxel grid 805 is shown following an additional update of the SDF values for voxels 810. At 860, surface boundary 825 is shown as updated based on the updated SDF values shown at 850, with respect to the SDF values shown at 800 and 830. Voxel subsets A3, A4, B3, B4, and C4 experience a threshold change in SDF values, as at least two voxels in each subset transition between the interior and exterior of surface boundary 807. Marching Squares is thus executed for these subsets, and their respective contour segments updated accordingly. One voxel within voxel subset C3 changes from a positive SDF value to a negative SDF value from 830 to 850, resulting in a threshold change for voxel subset C3 from 800 to 850 (i.e., the change from 800 to 830 is summed with the change from 830 to 850). Accordingly, Marching Squares is executed for voxel subset C3, and the discontinuity along surface boundary 825 is repaired.

While described above in the context of a 3D model that is based off of depth information obtained by a depth measuring device, the present disclosure is equally as applicable to other types of 3D modelling. In general, a grid of voxels representing space can change due to input (or for any other reason), and computation used to maintain a mesh can be saved by selectively updating the mesh as described above. For example, a simulation system could model a fluid flow as a signed distance field and generate mesh at a particular isolevel. In such a case, new information is not being integrated—all computations are performed using existing information. The methods described herein can be used to reduce compute cost for generation of any mesh representing changing isosurfaces, regardless of how the 3D model is updated.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
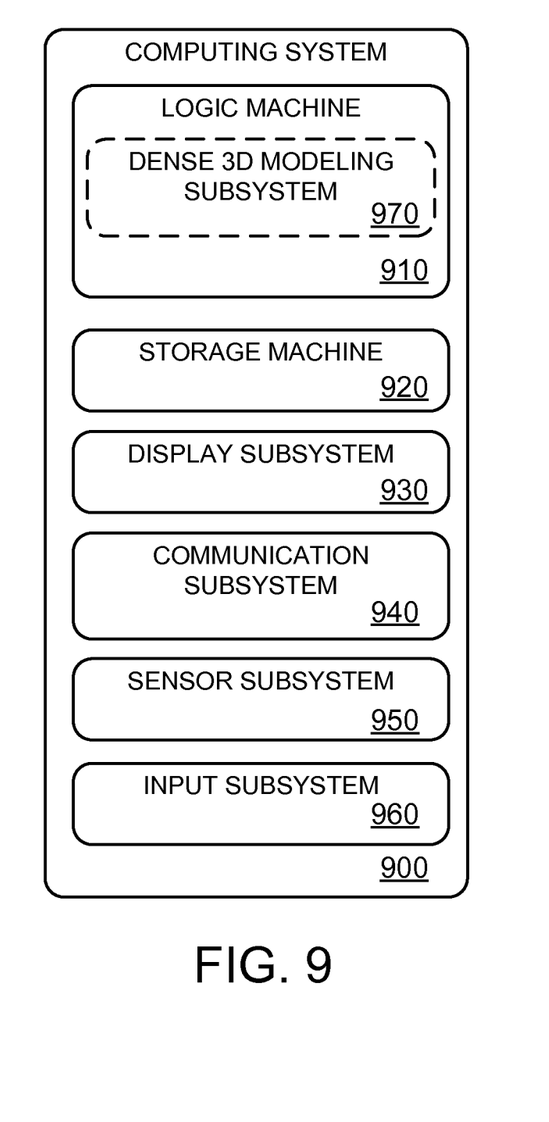
FIG. 9 schematically shows a computing system useable to selectively regenerate a surface mesh for a 3-Dimensional rendering.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, communication subsystem 940, sensor subsystem 950, input subsystem 960, and/or other components not shown in FIG. 9. Computing system 900 may include a 3D modeling subsystem 970, which may be included in logic machine 910.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 930 may be used to present a visual representation of data held by storage machine 920. This visual representation may take the form of a graphical user interface (GUI). As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, communication subsystem 940 may be configured to communicatively couple computing system 900 with one or more other computing devices. Communication subsystem 940 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

When included, sensor subsystem 950 may include one or more sensors configured to sense different physical phenomenon (e.g., visible light, infrared light, sound, acceleration, orientation, position, etc.) as described herein. For example, sensor subsystem 950 may include one or more inward facing optical sensors, one or more outward facing optical sensors, and one or more positional sensors. Sensor subsystem 950 may be configured to provide sensor data to logic machine 910, for example. As described herein, such data may include gaze tracking information, depth tracking information, image information, audio information, ambient lighting information, position information, motion information, user location information, and/or any other suitable sensor data that may be used to perform the methods and processes described above.

When included, input subsystem 960 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, 3D modeling subsystem 970 may receive information from storage machine 920, communication subsystem 940, sensor subsystem 950, and/or input subsystem 960. In particular, 3D modeling subsystem 970 may receive depth information pertaining to an environment such as depth image frames and 6DOF camera pose data. 3D modeling subsystem 970 may use the received information to form a 3D model which may be stored on storage machine 920, and may be output to display subsystem 930 and/or communication subsystem 940. The 3D model may be updated upon receipt of new depth information as described herein.

An example method may include computer-generating a 3D voxel grid of an environment; for each voxel in the 3D voxel grid, computer-assigning a signed value representative of that voxel's distance from a nearest surface; for each subset of the 3D voxel grid comprising a surface, computer-generating an initial surface mesh; and selectively computer-generating an updated surface mesh on only those subsets of the 3D voxel grid that exhibit greater than threshold change in signed values over time. In any example described herein, the 3D voxel grid may be computer-generated from depth information received via a depth camera, the depth information comprising: one or more depth images of the environment; and information indicating a 6DOF pose of the depth camera relative to the environment at time of depth image capture. In any example described herein, the signed value for a voxel may be a signed distance field value proportionate to a distance between the voxel and the nearest surface. In any example described herein, the nearest surface may include a surface point nearest to the voxel when compared to all other imaged surface points In any example described herein, the nearest surface may include a surface point located on a ray extending from a depth camera through the voxel. In any example described herein, a signed distance field value may be normalized and then truncated if an absolute value of the normalized signed distance field value is greater than a threshold. In any example described herein, computer-generating an initial surface mesh may comprise extracting an isosurface from the 3D voxel grid based on the signed values for each voxel within the 3D voxel grid. In any example described herein, extracting an isosurface from the 3D voxel grid may comprise executing a Marching Cubes algorithm on the 3D voxel grid. In any example described herein, for each voxel in the 3D voxel grid, an updated signed value may be computer-assigned based on the new depth information; for each subset of the 3D voxel grid, a difference between the updated signed values and previously assigned signed values may be recognized for all voxels within the subset; an updated surface mesh may be generated on only those subsets of the 3D voxel grid where the recognized difference is greater than a threshold. In any example described herein, the recognized difference between each new signed value and each previous signed value may be summed over time, and an updated surface mesh may be generated for subsets of the 3D voxel grid responsive to a sum of recognized differences exceeding the threshold. In any example described herein, recognizing a difference between the updated signed values and previously assigned signed values for all voxels within the subset may include calculating a sum of absolute differences between the updated signed values and previously assigned signed values at each voxel within the subset.

An example 3D modeling computer may include a depth camera interface configured to receive depth information from a depth camera; a logic machine; and a storage machine holding instructions executable by a logic machine to receive the depth information for an environment; generate a 3D voxel grid of the environment; for each voxel in the 3D voxel grid, assign a signed value representative of that voxel's distance from a nearest surface; for each subset of the 3D voxel grid comprising a surface, generate an initial surface mesh based on the signed values; and selectively generate an updated surface mesh on only those subsets of the 3D voxel grid that exhibit greater than threshold change in signed values over time. In any example described herein, receiving depth information for an environment may include receiving one or more depth images of the environment from the depth camera; and receiving 6DOF pose information from a sensor subsystem indicating a location and orientation of the depth camera at time of depth image capture. In any example described herein, the signed value for a voxel may be a signed distance field value proportionate to a distance between the voxel and a nearest corresponding point in the one or more depth images. In any example described herein, the signed distance field value may be normalized and then truncated if an absolute value of the normalized signed distance field value is greater than a threshold. In any example described herein, a storage machine may further hold instructions executable by the logic machine to receive new depth information for the environment for each voxel in the 3D voxel grid, assign an updated signed value based on the new depth information for each subset of the 3D voxel grid, recognize a difference between the updated signed values and previously assigned signed values for all voxels within the subset; and generate an updated surface mesh on only those subsets of the 3D voxel grid where the recognized difference is greater than a threshold. In any example described herein, the new depth information may include two or more subsequent depth images, wherein the recognized difference between each new signed value and each previous signed value may be summed over time, and wherein an updated surface mesh may be generated for subsets of the 3D voxel grid responsive to a sum of recognized differences exceeding the threshold. In any example described herein, the storage machine may further hold instructions executable by the logic machine to recognize a difference between the updated signed values and previously assigned signed values by calculating a sum of absolute differences between the updated signed values and previously assigned signed values at each voxel within the subset.

An example method includes receiving depth information for an environment via a depth camera; computer-generating a 3D voxel grid of the environment; for each voxel in the 3D voxel grid, computer-assigning a signed value representative of that voxel's distance from a nearest surface; for each subset of the 3D voxel grid comprising a surface, computer-generating with a marching cubes algorithm an initial surface mesh; and selectively computer-generating with the marching cubes algorithm an updated surface mesh on only those subsets of the 3D voxel grid that exhibit greater than threshold change in signed values over time. In any example described herein, greater than threshold change in signed values over time may include a sum of recognized changes exceeding the threshold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method, comprising:
   computer-generating a 3D voxel grid of an environment based on initial depth information received via a depth camera;
   for each voxel in the 3D voxel grid, computer-assigning an initial signed value representative of that voxel's distance from a nearest surface;
   for each subset of voxels in the 3D voxel grid comprising a surface, computer-generating an initial surface mesh;
   receiving, via the depth camera, updated depth information for the environment;
   for each voxel in the 3D voxel grid, computer-assigning an updated signed value based on the updated depth information;
   for each subset of voxels in the 3D voxel grid, determining an absolute difference between the updated signed value and the initial signed value for all voxels within the subset;
   comparing the determined absolute difference to a non-zero threshold, the non-zero threshold based on a maximum allowed magnitude of discontinuity between adjacent subsets of voxels;
   selectively computer-generating an updated surface mesh on only those subsets of voxels in the 3D voxel grid that exhibit greater than the non-zero threshold absolute difference between the updated signed value and the initial signed value; and
   maintaining the initial surface mesh on those subsets of voxels in the 3D voxel grid where the absolute difference between the updated signed value and the initial signed value is less than the non-zero threshold, regardless of whether an updated surface mesh is computer-generated for adjacent subsets of voxels.

2. The method of claim 1, wherein the depth information comprises:
   one or more depth images of the environment; and
   information indicating a 6DOF pose of the depth camera relative to the environment at time of depth image capture.

3. The method of claim 2, wherein each signed value for a voxel is a signed distance field value proportionate to a distance between the voxel and the nearest surface.

4. The method of claim 3, wherein the nearest surface includes a surface point nearest to the voxel when compared to all other imaged surface points.

5. The method of claim 3, wherein the nearest surface includes a surface point located on a ray extending from the depth camera through the voxel.

6. The method of claim 3, wherein the signed distance field value is normalized and then truncated if an absolute value of the normalized signed distance field value is greater than a threshold.

7. The method of claim 1, wherein computer-generating the initial surface mesh comprises extracting an isosurface from the 3D voxel grid based on the initial signed values for each voxel within the 3D voxel grid.

8. The method of claim 7, wherein extracting an isosurface from the 3D voxel grid comprises executing a Marching Cubes algorithm on the 3D voxel grid.

9. The method of claim 1, wherein the determined absolute difference between each updated signed value and each previously assigned signed value is summed over time, and wherein an updated surface mesh is generated for subsets of voxels in the 3D voxel grid responsive to a sum of determined absolute differences exceeding the non-zero threshold.

10. The method of claim 1, where determining the absolute difference between the updated signed values and previously assigned signed values for all voxels within the subset comprises:
    calculating a sum of absolute differences between the updated signed values and previously assigned signed values at each voxel within the subset.

11. A 3D modeling computer, comprising:
    a depth camera interface configured to receive depth information from a depth camera;
    a logic machine; and
    a storage machine holding instructions executable by a logic machine to:
      receive initial depth information for an environment;
      generate a 3D voxel grid of the environment;
      for each voxel in the 3D voxel grid, assign an initial signed value representative of that voxel's distance from a nearest surface;
      for each subset of the voxels in the 3D voxel grid comprising a surface, generate an initial surface mesh based on the signed values;
      receive updated depth information for the environment;
      for each voxel in the 3D voxel grid, assign an updated signed value based on the updated depth information;
      for each subsets of voxels in the 3D voxel grid, determine an absolute difference between the updated signed value and the initial signed value for all voxels within the subset;
    compare the determined absolute difference to a non-zero threshold, the non-zero threshold based on a maximum allowed magnitude of discontinuity between adjacent subsets of voxels;
      selectively generate an updated surface mesh on only those subsets of voxels in the 3D voxel grid that exhibit greater than the non-zero threshold absolute difference between the updated signed value and the initial signed value; and
      maintain the initial surface mesh on those subsets of voxels in the 3D voxel grid where the absolute difference between the updated signed value and the initial signed value is less than the non-zero threshold, regardless of whether an updated surface mesh is computer-generated for adjacent subsets of voxels.

12. The 3D modeling computer of claim 11, wherein receiving the depth information for the environment comprises:
   receiving one or more depth images of the environment from the depth camera; and
   receiving 6DOF pose information from a sensor subsystem indicating a location and orientation of the depth camera at time of depth image capture.

13. The 3D modeling computer of claim 12, wherein each signed value for a voxel is a signed distance field value proportionate to a distance between the voxel and a nearest corresponding point in the one or more depth images.

14. The 3D modeling computer of claim 13, wherein the signed distance field value is normalized and then truncated if an absolute value of the normalized signed distance field value is greater than a threshold.

15. The 3D modeling computer of claim 11, wherein the updated depth information includes two or more subsequent depth images, wherein the determined absolute difference between each updated signed value and each previously assigned signed value is summed over time, and wherein an updated surface mesh is generated for subsets of voxels in the 3D voxel grid responsive to a sum of determined absolute differences exceeding the non-zero threshold.

16. The 3D modeling computer of claim 11, wherein the storage machine further holds instructions executable by the logic machine to:
   determine the absolute difference between the updated signed values and previously assigned signed values by calculating a sum of absolute differences between the updated signed values and previously assigned signed values at each voxel within the sub set.

17. A method, comprising:
   receiving depth information for an environment via a depth camera;
   computer-generating a 3D voxel grid of the environment based on initial depth information;
   for each voxel in the 3D voxel grid, computer-assigning an initial signed value representative of that voxel's distance from a nearest surface;
   for each subset of voxels in the 3D voxel grid comprising a surface, computer-generating with a marching cubes algorithm an initial surface mesh;
   receiving, via the depth camera, updated depth information for the environment;
   for each voxel in the 3D voxel grid, computer-assigning an updated signed value based on the updated depth information;
   for each subset of voxels in the 3D voxel grid, determining an absolute difference between the updated signed value and the initial signed value for all voxels within the subset;
   comparing the determined absolute difference to a non-zero threshold, the non-zero threshold based on a maximum allowed magnitude of discontinuity between adjacent subsets of voxels;
   selectively computer-generating with the marching cubes algorithm an updated surface mesh on only those subsets of voxels in the 3D voxel grid that exhibit greater than the non-zero threshold absolute difference between the updated signed value and the initial signed value; and
   maintaining the initial surface mesh on those subsets of voxels in the 3D voxel grid where the absolute difference between the updated signed value and the initial signed value is less than the non-zero threshold, regardless of whether an updated surface mesh is computer-generated for adjacent subsets of voxels.

18. The method of claim 17, where greater than the non-zero threshold absolute difference between the updated signed value and the initial signed value includes a sum of determined changes exceeding the non-zero threshold.

* * * * *